United States Patent [19]
Kasbekar et al.

[11] Patent Number: 5,982,882
[45] Date of Patent: Nov. 9, 1999

[54] MICROPHONE SUB-ASSEMBLIES USING ELASTOMERIC HOUSINGS

[75] Inventors: Pratod V. Kasbekar, Manalapan; Harish S. Mangrulkar, Colonia, both of N.J.

[73] Assignee: Lucent Technologies, Inc., Murray Hill, N.J.

[21] Appl. No.: 08/940,833

[22] Filed: Sep. 30, 1997

[51] Int. Cl.[6] .................................................. H04M 1/00
[52] U.S. Cl. ............................................................ 379/433
[58] Field of Search .................................... 381/355, 360, 381/368; 379/433, 428, 434

[56] References Cited

U.S. PATENT DOCUMENTS

| | | | |
|---|---|---|---|
| 4,690,242 | 9/1987 | Mark | 181/0.5 |
| 4,773,091 | 9/1988 | Busche et al. | 379/433 |
| 5,802,198 | 9/1998 | Beavers et al. | 381/344 |

*Primary Examiner*—Jack Chiang
*Attorney, Agent, or Firm*—Michael Y. Epstein; Henry I. Schanzer

[57] ABSTRACT

Microphone sub-assemblies for direct mounting on a telephone handset inner substrate comprise a tubular wall containing a microphone comprising a cylindrical can and elongated terminal pins extending from the can. The tubular wall is formed from a strip of an elastomeric material wrapped around and adhered to the microphone with the microphone terminal pins extending directly through the wall, in hermetic fit therewith, and radially from the wall. The sub-assembly is mounted in a telephone internal substrate by inserting the microphone terminal pins into a connector on the substrate. Both the sub-assembly and the substrate are firmly secured within a telephone housing with an open end of the tubular housing aligned with a sound admitting port through the telephone housing.

16 Claims, 2 Drawing Sheets

MICROPHONE SUB-ASSEMBLIES USING ELASTOMERIC HOUSINGS

BACKGROUND OF THE INVENTION

This invention relates to microphone sub-assemblies for inclusion in telephones and the like, and particularly to microphone sub-assemblies which lend themselves to automated mounting procedures.

As last steps in the manufacture of a telephone handset, a fairly rigid substrate, which may comprise one or more printed circuit boards with various electronic/optical components mounted thereon, is sandwiched between two molded plastic housing halves which are snap-fitted or otherwise fastened together. These last steps are well suited for automated assembly processes using relatively simple robotic (programmed) tools. A complication in the assembly process, however, is the microphone sub-assembly which must also be mounted within the telephone handset.

In one arrangement, the microphone sub-assembly comprises a quite small circular cylinder having end ports for admitting sound to a transducer within the cylinder and a two-part molded plastic container snap-fitted around the microphone cylinder. The plastic container serves a number of roles: it encloses and protects the microphone (as well as providing one or more internal acoustic sound chambers); it provides surfaces for firm mounting of the container within the housing; and it provides a sealed exit port for wires from the microphone to a wire terminating connector which, as part of the assembly process, is snap-fitted within a mating connector on the component containing substrate.

The complication presented by the microphone sub-assembly is that it is quite difficult to assemble the sub-assembly into the handset. Thus, in addition to the steps of picking-up and properly orienting and mounting the sub-assembly, the connector at the end of the microphone wires must be inserted into its mating connector on the substrate and the microphone wires must be properly nested within the housing. If the wires are not properly nested, they can be pinched between the two housing halves when they are snap-fitted together. This, of course, causes numerous problems. Indeed, owing to the difficulty of assembling the microphone sub-assembly into the handset, this assembly is generally done by hand rather than, as preferred, by machine. This problem, among others, is addressed by the invention.

SUMMARY OF THE INVENTION

A microphone sub-assembly for being disposed within a telephone or the like comprises a microphone comprising a cylindrical can and terminal leads extending from the can. A strip of elastomeric material having pin receiving openings is wrapped around and adhered to the microphone for forming a tubular housing wall with the microphone pins extending outwardly through the pin receiving openings through the wall. The extending pins are inserted into a connector mounted on a substrate for securing the sub-assembly to the substrate and for electrically connecting the microphone to electrical components on the substrate. A housing for the telephone (or the like) is mounted onto and around the substrate for enclosing the substrate and the sub-assembly with the tubular wall of the sub-assembly in alignment with a sound admitting port through the telephone housing.

BRIEF DESCRIPTION OF THE DRAWINGS

The drawings are schematic and not to scale.

DESCRIPTION OF PREFERRED EMBODIMENTS

Figure 1:
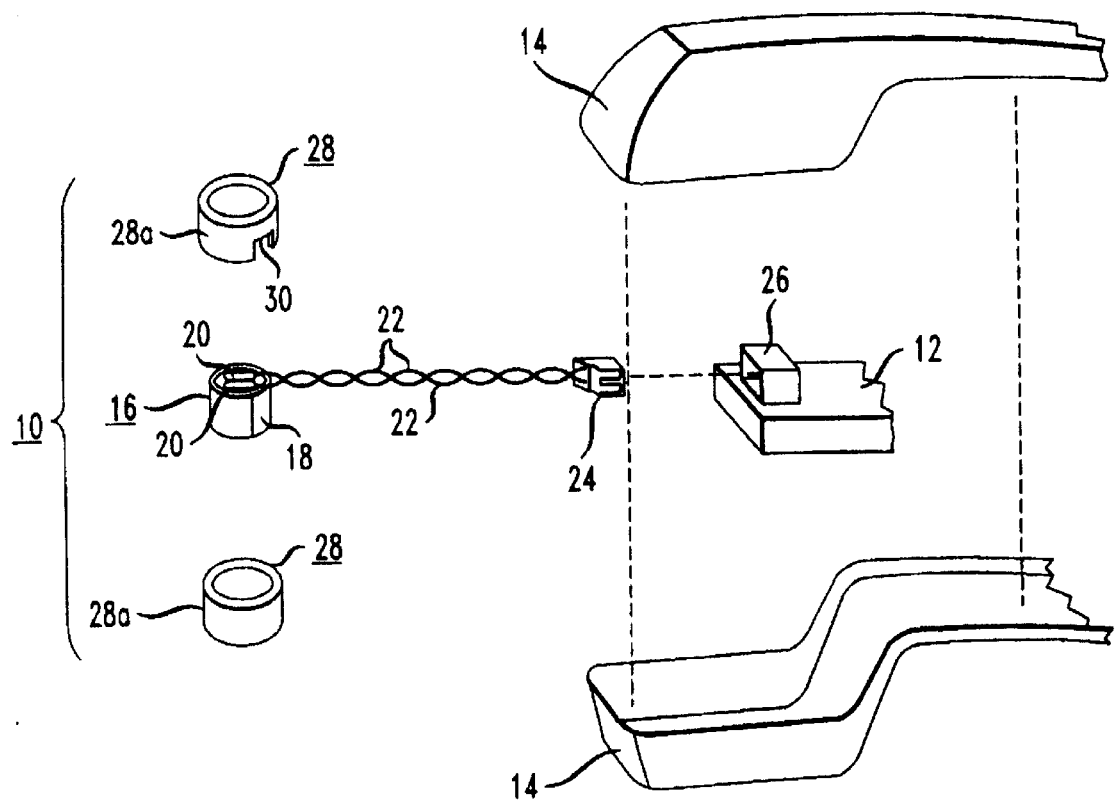
FIG. 1 is a view, in perspective and exploded, of a known microphone sub-assembly for use in a telephone handset.

FIG. 1 shows an example of a prior art microphone sub-assembly 10 and a portion of a substrate 12 to which the sub-assembly 10 is connected. Both the microphone sub-assembly and the substrate are disposed within a telephone handset housing formed by molded plastic housing halves 14 which are snap-fitted together onto and around the substrate in known manner.

The microphone sub-assembly 10 comprises a basic microphone 16 comprising a circular cylindrical can 18 containing an acoustically sensitive diaphragm producing an electrical signal picked-up by two electrodes connected to terminal pins 20 extending a short distance outwardly from the can 18. The two pins are soldered to the ends of wires 22 terminating in a connector 24 for mating with a corresponding connector 26 mounted on the substrate 12. The microphone 16 is disposed within a container 28 shown in FIG. 1 as comprising two halves 28a which are glued together. The container 28, e.g., of rubber, protects the microphone as well as providing one or more acoustic chambers adjoining sound entry ports into the microphone for providing certain processing of the sound reaching the microphone diaphragm. (In microphones having noise-cancelling characteristics, sound ports are provided at opposite ends of the microphone can. In use of the microphone, one end faces directly towards a speaker whose speech enters through the microphone one end along with ambient noise. The ambient noise also enters the other end of the microphone which, because of the position of the microphone other end, receives little of the speech sounds. To some extent, aided by electronics on the substrate, the two identical noise signals entering the microphone from opposite ends tend to cancel one another.)

The container 28 has ports for admitting sounds into the acoustic chambers. Preferably, for good sound quality, the container should completely acoustically seal the microphone except for the intended sound ports. A problem with the two piece container, however, is that, as indicated in FIG. 1, a small slot 30 is provided through the wall of one of the container halves 28a for the exiting of the microphone wires. While the two container halves are sealed together along with a sealant fluid placed in the slot 30 for acoustically sealing it, small leakage paths for sound do occasionally occur which are quite detrimental to sound quality. This is one problem solved according to the present invention.

Although not shown in FIG. 1, as being known, the microphone sub-assembly 10 is mounted within a seat or pocket formed by the housing halves 14, and electrical connections between the microphone and the substrate 12 are by way of the wires 22 and the connectors 24 and 26. A problem created by this arrangement, previously referred to, is that the handset assembly process requires that the microphone connector 24 be first mated with the substrate mounted connector 26, and the microphone container 28 then be seated in one of the housing halves with the microphone wires properly nested within the housing half so as not to be pinched between mating portions of the housing halves. While proper assembly is regularly obtained, the care required to accomplish it generally precludes the use of simple-minded robotic tools. This is another problem solved by this invention.

One embodiment of the invention is shown in FIGS. 2 through 7. Shown in these figures is a microphone sub-assembly 40 comprising a microphone 42 (FIGS. 2 and 7) contained within a tubular wall housing 44. As described hereinafter, the housing can be of an elastomeric material, e.g., rubber, plastic or the like. Preferred materials are plastic-like materials specially formulated for packaging purposes. Examples are Santoprene, a trade name of Advanced Elastomeric Systems, Akron, Ohio, or Lomod, a trade name of G.E. Plastics, Pittsfield, Mass.

The microphone 42 (including an outer cylindrical can 43) is basically the same as previously used except that the microphone electrical pins 46 are somewhat longer than as previously used and the pins 46 extend through and outwardly from the housing 44. (In the prior art arrangement shown in FIG. 1, the pins 20 are of a length just sufficient to enable the soldering of the pins to the ends of the wires 22.) Also, while the housing 44 of the inventive sub-assembly is different (as hereinafter described) from the container 28 shown in FIG. 1, acoustic chambers 48 disposed at opposite ends 50 of the housing can be identical in design and function as the acoustic chambers formed by the prior art container 28.

The housing 44 is in the form of a circular cylinder of uniform outer diameter except for the ends 50 of the housing which taper inwardly for ease of mounting of the housing 44 within a seat 94 (FIG. 7) within a telephone handset 54.

The inside diameter of the housing 44 has two uniform inner diameters; one uniform inner diameter being at locations above and below the microphone 42, and the other uniform diameter corresponding to the outer diameter of the microphone can 43. The inner configuration of the housing 44 is relevant to the fit of the microphone 42 within the housing 44 as hereinafter described.

Figure 2:
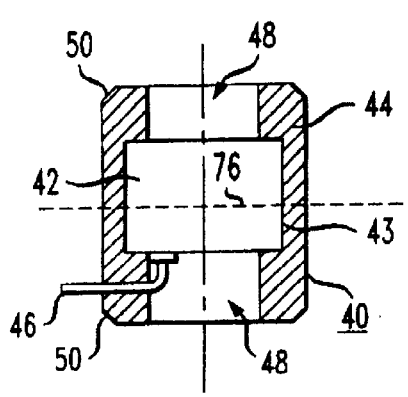
FIG. 2 is a side sectional view of a microphone sub-assembly in accordance with the invention.
Figure 3:
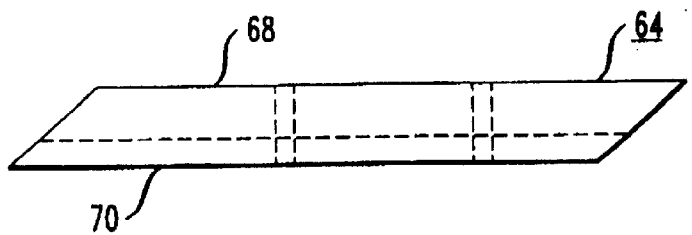
FIGS. 3 and 4 are plan and side views, respectively, of a strip of material used to provide a microphone housing shown in FIG. 2.
Figure 4:
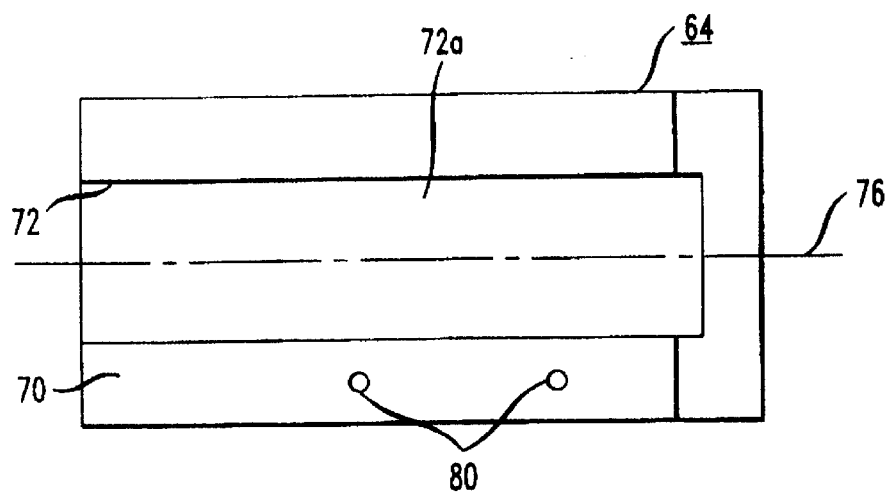
Figure 5:
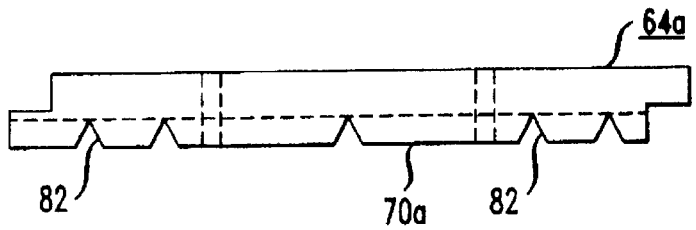
FIGS. 5 and 6 are similar to FIGS. 3 and 4, respectively, but showing a modification of the strip shown in FIGS. 3 and 4.

FIGS. 3 and 4 show a strip 64 of an elastomeric material. The strip 64 is to be wrapped around and adhered to the microphone can 43 (FIG. 2) and, to this end, a first surface 68 of the strip 64 is flat while a second surface 70 of the strip has an indentation 72 coated with a layer 72a of a known pressure sensitive or epoxy adhesive material, or the like. Also, to provide a neat and tight fitting joint between the ends of the strip 64 when wrapped around the microphone can 43, the strip side edges are beveled as shown in FIG. 3 or edge indented as shown in FIG. 5.

The strip 64 shown in FIG. 4 is shown oriented similarly as the strip (the housing 44) is shown oriented in FIG. 2. A horizontal axis 76 is shown in FIGS. 2 and 4, and the adhesive containing indentation 72 is centered on and parallel to the axis 76. A pair of microphone receiving holes 80 extending entirely through the strip 64 are spaced apart along a direction parallel to the axis 76.

In the assembly of the sub-assembly 40 shown in FIG. 2, the microphone pins 46 are first inserted through the strip openings 80. This serves to properly orient the strip 64 relative to the microphone can 43. (Preferably, the ends of the microphone pins 46 are rounded and the diameters of the pins are slightly greater than the diameters of the holes 80 through the strip 64 of elastomeric material. The elastomeric strip material yields to allow passage of the leads, but firmly and hermetically seals around the pins. The hermetic seals so formed are quite firm and reliable and prevent any leakage of sounds into the housing along the pin-to-housing seals. This avoids the problem of leakage previously described in connection with the prior art sub-assembly shown in FIG. 1.)

With the microphone pins 46 threaded through the strip openings 80, the strip 64 is wrapped around the can 43 and secured to the can by the adhesive layer 72a. The strip indentation 72 precisely aligns with the microphone can as shown in FIG. 2. The adhesive layer 72a on the indentation firmly adheres the strip to the microphone with the strip ends forming a tightly fitting overlapping joint with the ends of the microphone can.

The wrapped around strip 64 comprises the tubular housing 44 which serves as a means for mounting the microphone sub-assembly 40 within the handset. To this end, the tubular housing 44 is relatively rigid. This requires that the strip 64 wrapped around the microphone be itself rigid. In general, by using a strip 64 of one of the aforementioned materials and having a thickness of at least about 2 mm, adequate rigidity of the resultant housing 44 is obtained while still providing sufficient flexibility of the strip 64 for ease of wrapping.

Figure 6:
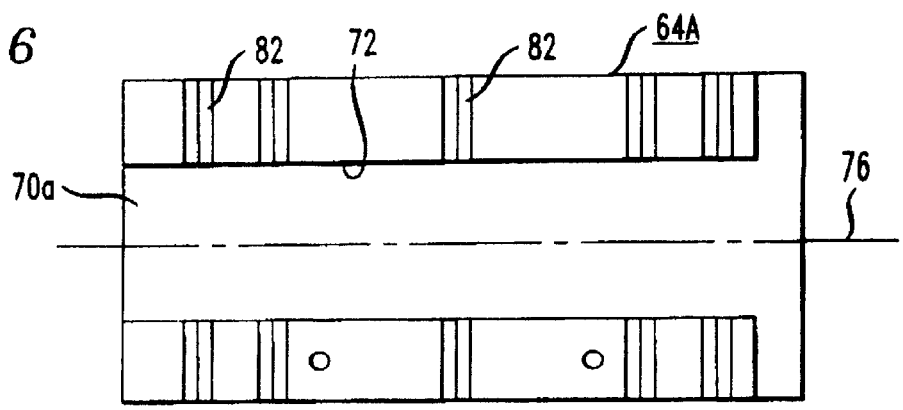

Additional flexibility for greater ease of wrapping can be provided as shown in FIGS. 5 and 6. In the strip 64a illustrated, a number of longitudinally extending score lines 82 are provided on what is to be the inside surface 70a of the housing.

Preferably, but not critically, the score lines 82 have a depth about the same as the depth of the adhesive coated indentation 72. The score lines 82 thus do not continue across the indentation.

In the wrapping process, the score lines 82 serve as hinges for providing greater flexibility of the strip 64a. By omitting the score lines from the strip indentation 72, full surface to surface contact is provided between the adhesive coated indentation 72 and the microphone can 43 outer surface.

Figure 7:
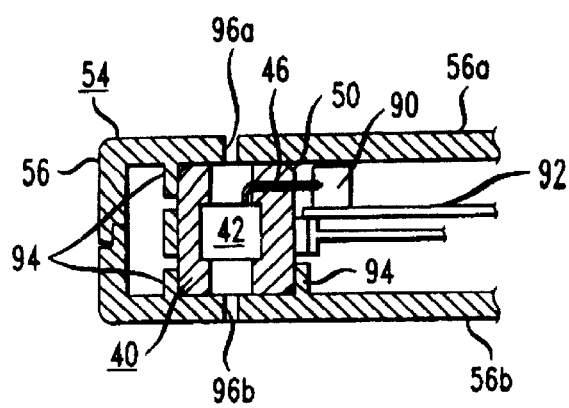
FIG. 7 is a cut-away side view of a telephone handset enclosing the microphone sub-assembly shown in FIG. 2.

The sub-assembly 40 shown in FIG. 2 is now ready for being mounted within a handset 54 as shown in FIG. 7. The microphone pins 46 extend from the housing 44 and are directly mated with a known type connector 90 on the handset substrate 92. (Significantly, no intermediate means are used for connecting the microphone pins 46 to the connector 90 in comparison with the wires 22 and connector 24 used in the prior art shown in FIG. 1.

FIG. 7 shows the microphone sub-assembly 40 seated within a completed telephone handset 54 of generally known type comprising parts already referred to; i.e., a rigid substrate 92 on which are mounted various electrical and/or optical components, a connector 90 mounted on the substrate 92 and electrically connected to various components on the substrate, and a telephone handset housing 56 comprising two halves 56a snap-connected to one another and on and around the substrate 92 in known manner.

In the mounting of the sub-assembly 40 and the substrate 92, prior to the addition of the telephone housing 56, the sub-assembly 40 is aligned with the substrate connector 90 and moved towards the connector for inserting the leading ends of the sub-assembly terminal pins 46 directly into the connector and in snug fit therewithin. The sub-assembly 40 is thus mounted, as shown in FIG. 7, in cantilevered relation to the substrate 92, i.e., it extends away from an end of the substrate 92. The mounting of the sub-assembly 40 directly onto the substrate involves quite simple movements readily performed by a simple, readily available and relatively inexpensive (programmed) tool. No flexible wires are present, as in the prior art sub-assembly shown in FIG. 1, and known connectors can be used for providing quite rigid and reliable contacting between the sub-assembly 40 and the connector 90.

With the sub-assembly 40 mounted on the substrate 92, the telephone housing halves 56a are snapped into place on and around the substrate 92 and around the cantilevered sub-assembly 40. As shown in FIG. 7, the two telephone housing halves 56a include integrally formed bosses 94 (extending walls) defining a seat for snug, sandwiched fit of the sub-assembly 40 between the housing halves. The assembly of the telephone housing 54 is also preferably done automatically and the aforementioned beveled ends 50 of the sub-assembly housing 44 provide means for guiding the telephone housing halves 56a into proper alignment and engagement with the sub-assembly.

In FIG. 7, the sub-assembly 40 is shown so aligned relative to the substrate 92 as to align the open ends 50 of the tubular wall housing 44 with sound ports 96 through the telephone housing. In this embodiment, the telephone is of the noise cancelling type, as previously described in connection with FIG. 1, and two sound ports 96a and 96b are used for directing sounds (information containing sounds, e.g., speech and ambient noise) to the microphone 42 of the sub-assembly 40.

As previously explained, in connection with the description of the prior art microphone shown in FIG. 1, it is important to avoid leakage paths for sound to the microphone within the microphone sub-assembly. As mentioned, the microphone pins 46 are hermetically sealed in their passage through the housing wall. Such hermetic sealing is readily attained owing to the yielding but surface clinging nature of elastomeric materials. Similarly, by providing a snug fit between the ends 50 of the housing 44 and inner surfaces of the telephone housing surrounding the telephone sound ports 96, leakage paths to the microphone along the inner surfaces of the handset from sound sources other than the sound ports are completely avoided.

What is claimed is:

1. A microphone sub-assembly comprising a housing including a tubular wall having an inner surface surrounding a space within the housing, a microphone comprising a can and terminal pins extending from the can, said microphone being disposed within said space with said terminal pins extending through said wall for making electrical connections to connectors external to said sub-assembly, said wall comprising an elastomeric material adhered to said can.

2. A sub-assembly according to claim 1 wherein said wall inner surface includes three axially extending sections including a first section disposed between two sections at respective opposite ends of said wall, said inner surface first section being in full surface to surface contact with said can, said two end sections being disposed axially beyond respective opposite ends of said can, and said inner surface first section being indented relative to said inner surface two sections.

3. A sub-assembly according to claim 2 including axially extending score lines on said wall inner surface.

4. A sub-assembly according to claim 3 wherein said score lines are disposed only on said two end sections of said inner surface.

5. A sub-assembly according to claim 1 wherein said terminal pins are hermetically sealed through said wall.

6. A sub-assembly according to claim 1 in combination with a telephone in which the sub-assembly is mounted, said telephone including an outer housing enclosing a substrate, said sub-assembly being rigidly mounted on said substrate by means of a direct connection between said microphone terminal pins and a portion of said substrate.

7. A sub-assembly according to claim 6 wherein the sub-assembly is in cantilevered mounted relation with said substrate, and the sub-assembly is securely clamped between oppositely disposed portions of said telephone housing.

8. A sub-assembly according to claim 1 wherein said tubular wall has two oppositely disposed ends and an axis of elongation extending between said ends, and said pins extend in directions transverse to said axis and through said wall at positions intermediate said two ends.

9. A sub-assembly according to claim 2 wherein said pins extend through one of said two wall sections at positions between said wall opposite ends.

10. A sub-assembly according to claim 3 wherein said score lines are circumferentially spaced apart along said wall inner surface.

11. A sub-assembly according to claim 4 wherein said score lines are circumferentially spaced apart along said wall inner surface.

12. A sub-assembly according to claim 5 wherein said tubular wall has an axis of elongation, and said terminal pins extend through respective holes extending through said tubular wall in directions transverse to said axis.

13. A sub-assembly according to claim 10 wherein said first section of said wall inner surface is coextensive with, and extends between said opposite ends of, said can.

14. A sub-assembly according to claim 11 wherein said first section of said wall inner surface is coextensive with, and extends between said opposite ends of, said can.

15. A sub-assembly according to claim 7 wherein said substrate portion is spaced apart from said oppositely disposed housing portions, said terminal pins extend through said wall in directions transverse to a central axis of elongation of said wall, said substrate portion extends generally parallel to said transverse directions, a connector mounted on said substrate portion and projecting therefrom in a direction parallel to said central axis, and said terminal pins extend inwardly of said connector.

16. A sub-assembly according to claim 15 wherein opposite ends of said tubular housing are clamped against respective said oppositely disposed telephone housing portions and form therewith an enclosed space acoustically isolated from other interior portions of said telephone housing, and a sound port through one of said telephone housing portions for admitting sound signals into said enclosed space for pick-up by said microphone.

* * * * *